US008953493B2

(12) United States Patent
Jinguu

(10) Patent No.: US 8,953,493 B2
(45) Date of Patent: Feb. 10, 2015

(54) SETTING METHOD OF FIELD DEVICE AND SETTING SYSTEM OF FIELD DEVICE

(75) Inventor: Yoshiyuki Jinguu, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 86 days.

(21) Appl. No.: 13/618,775

(22) Filed: Sep. 14, 2012

(65) Prior Publication Data

US 2013/0083694 A1 Apr. 4, 2013

(30) Foreign Application Priority Data

Sep. 30, 2011 (JP) ................................. 2011-217251

(51) Int. Cl.
*H04L 12/28* (2006.01)
*G05B 19/042* (2006.01)

(52) U.S. Cl.
CPC .. *G05B 19/0421* (2013.01); *G05B 2219/25061* (2013.01)
USPC ........................................................ 370/254

(58) Field of Classification Search
CPC ...................... G05B 19/4185; G05B 19/0421
USPC ........................................................ 370/254
See application file for complete search history.

(56) References Cited

U.S. PATENT DOCUMENTS

| 5,796,602 | A  | * | 8/1998  | Wellan et al. .................... 700/1   |
|-----------|----|---|---------|-------------------------------------------|
| 2006/0077906 | A1 | * | 4/2006  | Maegawa et al. ............. 370/254     |
| 2007/0067512 | A1 | * | 3/2007  | Donaires et al. ................ 710/62  |
| 2009/0292915 | A1 | * | 11/2009 | Sakane ......................... 713/155  |
| 2009/0326852 | A1 | * | 12/2009 | Vetter et al. .................... 702/108 |
| 2011/0004685 | A1 | * | 1/2011  | De Groot et al. ............. 709/225     |
| 2012/0143586 | A1 | * | 6/2012  | Vetter et al. ...................... 703/20 |
| 2012/0259435 | A1 | * | 10/2012 | Ramsay ............................. 700/1  |
| 2013/0080585 | A1 | * | 3/2013  | Schaffner et al. ............. 709/217    |

FOREIGN PATENT DOCUMENTS

JP 2007-124206 A 5/2007

OTHER PUBLICATIONS

Takeuchi Tetsuo, "FDT/DTM Framework for New Field Device Tools", Yokogawa Technical Report, 2007, pp. 49-52, vol. 51, No. 2.
Takeuchi Tetsuo, "FDT/DTM Framework for New Field Device Tools", Yokogawa Technical Report English Edition, 2007, pp. 13-16, No. 4.
Mitsuhiro Yamamoto and Hideyuki Sakamoto, "FDT/DTM Framework for Field Device Integration", SICE Annual Conference 2008, Aug. 20-22, 2008, pp. 925-928.

* cited by examiner

*Primary Examiner* — Asad Nawaz
*Assistant Examiner* — Syed S Ali
(74) *Attorney, Agent, or Firm* — Sughrue Mion, PLLC

(57) ABSTRACT

A setting system of field devices may include a first communication path, a terminal device, a relay device, and a second communication path. The terminal device may include a receiving unit that receives an input operation of information, a first setting unit that performs the first setting for each of the field devices by transmitting information necessary for the first setting from the terminal device to each of the field devices through the second communication path in response to the input operation received by the receiving unit, and a second setting unit that performs a second setting for the terminal device, the second setting being necessary with the first setting for each of the field devices in response to the input operation received by the receiving unit.

14 Claims, 4 Drawing Sheets

SETTING METHOD OF FIELD DEVICE AND SETTING SYSTEM OF FIELD DEVICE

BACKGROUND OF THE INVENTION

1. Field of the Invention

The present invention relates to a setting method of a field device that is capable of performing setting for each field device, to which a communication line used in control data communication is connected, through a terminal device.

Priority is claimed on Japanese Patent Application No. 2011-217251, filed Sep. 30, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

When a field device is installed in a plant or when setting for the field device is changed, a setting process for various parameters such as device information and information necessary for communication is performed on the field device via communication.

FIG. 4 is a view illustrating a configuration example of a field control system in accordance with the related art. As shown in FIG. 4, the field control system includes a group of field devices having a field device 1, a multiplexer 2 connected to an upper level of the field device 1, a field controller 3 connected to an upper level of the multiplexer 2, and a manipulation monitoring device 4 and a connection terminal device 5 which are connected to an upper level of the field controller 3.

The manipulation monitoring device 4 performs an operation and monitoring related to field control of the field device 1 by using communication through a communication path that is via the multiplexer 2 and the field controller 3.

The connection terminal device 5 performs an operation for setting device information or information necessary for communication on the field device 1 through a communication path that is via the multiplexer 2 and the field controller 3. The connection terminal device 5 stores a device management database for which data input and data update are necessary corresponding to setting for the field device 1.

Next, an operation procedure when the setting process for the field device 1 is performed will be described. Two methods will be described below as examples of an operation method.

(Method 1)

The connection terminal device 5, which is a host, performs setting for the field device 1 by performing communication with the field device 1 through the communication path via the field controller 3 and the multiplexer 2.

In Method 1, the setting operation is performed by using the connection terminal device 5. Thereby, the connection terminal device 5 performs setting for the field device 1 and data input or data update to the device management database stored in the connection terminal device 5 simultaneously in parallel.

In Method 1, the field control uses the communication path between the field device 1 and the manipulation monitoring device. Thereby, the communication speed when performing setting for the field device 1 may be lowered, depending on the number of field devices, performance of the field controller 3 or the like, and thus the setting process may require a long time.

When setting for the field device 1 is performed, setting is necessary to specify a communication path for access from the connection terminal device 5 to the field device 1. For example, it is necessary to specify connection ports of the field controller 3 and the multiplexer 2 so that the connection terminal device 5 specifies the communication path to connect to the field device 1. As such, when the scale of the field control system is large, a complicated procedure is necessary.

(Method 2)

A portable terminal device 6 is used to perform setting for the field device 1. In Method 2, while the portable terminal device 6 is directly connected to the field device 1, input operations to an operation screen and an operation unit in the portable terminal device 6 are performed. Thereby, it is possible to write information to the field device 1.

In Method 2, since the portable terminal device 6 is directly connected to the field device 1, an operation in the field of a plant is necessary. In addition, it is difficult to access the connection terminal device 5 from the portable terminal device 6. As such, data input or data update to the device management database stored in the connection terminal device 5 needs to be performed through an operation on the connection terminal device 5, differently from the setting operation using the portable terminal device 6. For this reason, both an operation by an operator in the field of a plant and an operation by another operator in a control room or an instrument panel room, in which the connection terminal device 5 is installed, are necessary. As such, it is difficult for the operators to cooperate.

SUMMARY

The present invention provides a setting method of a field device and a setting system of a field device that reduce the burden of performing a setting process on the field device.

A setting system of field devices may include: a first communication path connected to each of the field devices; a terminal device that performs a first setting for each of the field devices through the first communication path; a relay device connected to each of the field devices; and a second communication path formed between each of the field devices and the terminal device via the relay device, the second communication path being different from the first communication path. The terminal device may include: a receiving unit that receives an input operation of information; a first setting unit that performs the first setting for each of the field devices by transmitting information necessary for the first setting from the terminal device to each of the field devices through the second communication path in response to the input operation received by the receiving unit; and a second setting unit that performs a second setting for the terminal device, the second setting being necessary with the first setting for each of the field devices in response to the input operation received by the receiving unit.

The relay device may be a setting terminal device having a function of performing the first setting for each of the field devices connected to the relay device by receiving the input operation in a state in which the relay device is directly connected to each of the field devices.

The first setting for each of the field devices may set various parameters such as device information and information necessary for communication.

The terminal device may store a device management database for which data input and data update are needed based on the first setting for each of the field devices. If write and change of parameters are performed on each of the field devices, then update of the device management database may be needed as the second setting for connection terminal device.

The terminal device may function as a terminal device on which a DTM frame, a DeviceDTM, and a virtual CommDTM operates. The relay device may include the DTM frame, a CommDTM, and a virtual DeviceDTM.

The virtual CommDTM and the virtual DeviceDTM may perform transfer of data by using a communication interface included in each of the terminal device and the relay device.

The communication interface may be one of Ethernet communication, Bluetooth, a telephone line, a satellite communication device, and a PLC.

A setting method of field devices that performs setting for each of the field devices through a terminal device, each of the field devices being connected to a first communication path that is used in control data communication, may include: forming a second communication path via a relay device between each of the field devices and the terminal device by connecting the relay device to each of the field devices, the second communication path being different from the first communication path; receiving an input operation of information by the terminal device; performing, by the terminal device, a first setting that sets for each of the field devices by transmitting information necessary for the first setting from the terminal device to each of the field devices through the second communication path in response to the input operation received by the terminal device; and performing, by the terminal device, a second setting that sets for the terminal device that is necessary with the first setting for each of the field devices in response to the input operation received by the terminal device.

The relay device may be a setting terminal device having a function of performing the first setting for each of the field devices connected to the relay device by receiving the input operation in a state in which the relay device is directly connected to each of the field devices.

The setting method of field devices may further include: performing the control data communication by using the second communication path.

The setting method of field devices may further include: collecting information stored in each of the field devices by using the second communication path.

The first setting for each of the field devices may set various parameters such as device information and information necessary for communication.

The terminal device may store a device management database for which data input and data update are needed based on the first setting for each of the field devices. If write and change of parameters are performed on each of the field devices, then update of the device management database may be needed as the second setting for connection terminal device.

The terminal device may function as a terminal device on which a DTM frame, a DeviceDTM, and a virtual CommDTM operates. The relay device may include the DTM frame, a CommDTM, and a virtual DeviceDTM.

The virtual CommDTM and the virtual DeviceDTM may perform transfer of data by using a communication interface included in each of the terminal device and the relay device.

The communication interface may be one of Ethernet communication, Bluetooth, a telephone line, a satellite communication device, and a PLC.

According to the setting method of a field device and the setting system of a field device of the preferred embodiment of the present invention, information necessary for setting for the field device is transmitted from a terminal device to the field device through the second communication path. Thereby, while the terminal device performs setting for the field device, the terminal device performs setting for the terminal device itself that is necessary along with the setting for the field device. As such, a burden of performing the setting process on the field device can be reduced.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
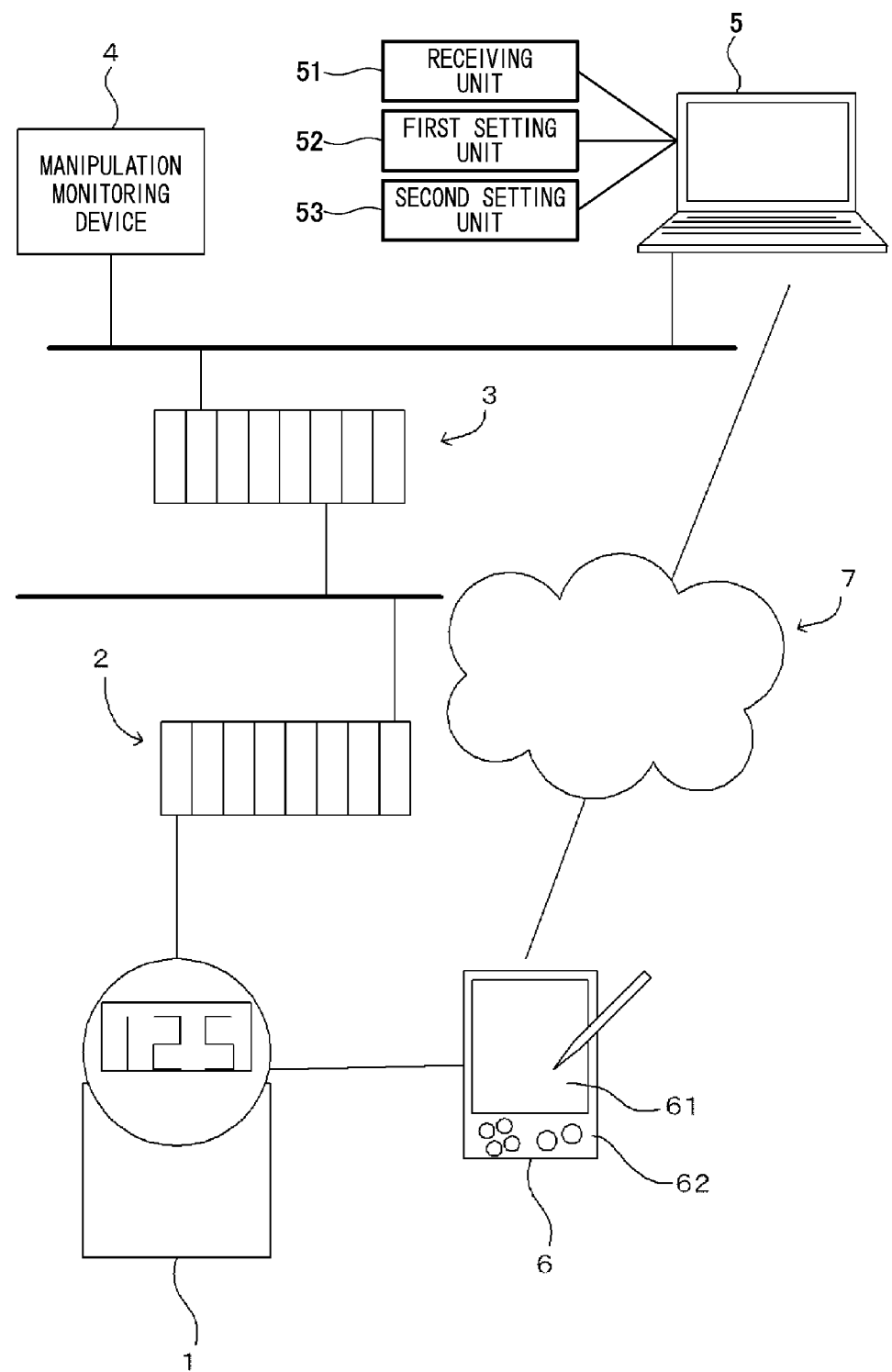
FIG. 1 is a block diagram illustrating a configuration example of a field control system that includes a setting system of a field device to which a setting method of a field device is applied in accordance with a first preferred embodiment of the present invention.

A first preferred embodiment of the present invention will be described. FIG. 1 is a block diagram illustrating a configuration example of a field control system that includes a setting system of a field device to which a setting method of a field device is applied in accordance with the first preferred embodiment of the present invention. FIG. 1 illustrates only a connection part associated with the field device to be subjected to the setting process, but a plurality of field devices may be connected to the field control system.

As illustrated in FIG. 1, the field control system includes a group of field devices having a field device 1, a multiplexer 2 connected to an upper level of the field device 1, a field controller 3 connected to an upper level of the multiplexer 2, and a manipulation monitoring device 4 and an connection terminal device 5 which are connected to an upper level of the field controller 3.

In the preferred embodiment of the present invention, the field control system further includes a portable terminal device 6 that is connected to the field device 1, and a communication line 7 formed between the portable terminal device 6 and the connection terminal device 5. The connection terminal device 5 includes a receiving unit 51 that receives an input operation of information; a first setting unit 52 that performs setting for the field device 1 by transmitting information necessary for the setting from the connection terminal device 5 to the field device 1 through the communication line 7 in response to the input operation received by the receiving unit 51; and a second setting unit 53 that performs setting for the connection terminal device 5 that is necessary with the setting for each of the field device 1 in response to the input operation received by the receiving unit 51.

The manipulation monitoring device 4 performs the operation and monitoring related to field control of the field device 1 by using communication through a first communication path that is via the multiplexer 2 and the field controller 3.

The connection terminal device 5 performs an operation for setting various parameters such as device information and information necessary for communication for the field device 1 through the first communication path that is via the multiplexer 2 and the field controller 3. The connection terminal device 5 stores a device management database for which data input and data update are needed based on setting for the field device 1. If write and change of parameters are performed on the field device 1, then update of the device management database is needed as a setting for the connection terminal device 5.

Next, an operation procedure when the setting process for the field device 1 is performed will be described. Three methods will be described below as examples of an operation method. The present invention is characterized in Method 3.

(Method 1)

The connection terminal device 5, which is a host, performs setting for the field device 1 by performing communication with the field device 1 through the first communication path via the field controller 3 and the multiplexer 2.

In Method 1, the setting operation is performed by using the connection terminal device 5. Thereby, the connection terminal device 5 performs setting for the field device 1, and data input or data update to the device management database stored in the connection terminal device 5 simultaneously in parallel.

In Method 1, the field control uses the first communication path between the field device 1 and the manipulation monitoring device. Thereby, the communication speed when performing setting for the field device 1 may be lowered, depending on the number of field devices, performance of the field controller 3 or the like, and thus the setting process may require a long time.

When setting for the field device 1 is performed, setting is necessary to specify the first communication path for access from the connection terminal device 5 to the field device 1. For example, it is necessary to specify connection ports of the field controller 3 and the multiplexer 2 so that the connection terminal device 5 specifies the first communication path to connect to the field device 1. As such, when the scale of the field control system is large, a complicated procedure is necessary.

(Method 2)

A portable terminal device 6 is used to perform setting for the field device 1. In Method 2, while the portable terminal device 6 is directly connected to the field device 1, input operations to an operation screen 61 and an operation unit 62 in the portable terminal device 6 are performed. Thereby, it is possible to write information to the field device 1.

In Method 2, since the portable terminal device 6 is directly connected to the field device 1, an operation in the field of a plant is necessary. In addition, it is difficult to access the connection terminal device 5 from the portable terminal device 6. As such, data input or data update to the device management database stored in the connection terminal device 5 needs to be performed through an operation on the connection terminal device 5, differently from the setting operation using the portable terminal device 6. For this reason, both an operation by an operator in the field of a plant and an operation by another operator in a control room or an instrument panel room, in which the connection terminal device 5 is installed, are necessary. As such, it is difficult for the operators to cooperate.

(Method 3)

In Method 3, the portable terminal device 6 is used as a relay device to perform setting for the field device 1 from the connection terminal device 5. In the first preferred embodiment of the present invention, an example using FDT/DTM standard advocated by FDTGroup is described as software for performing setting of the field device.

Figure 2:
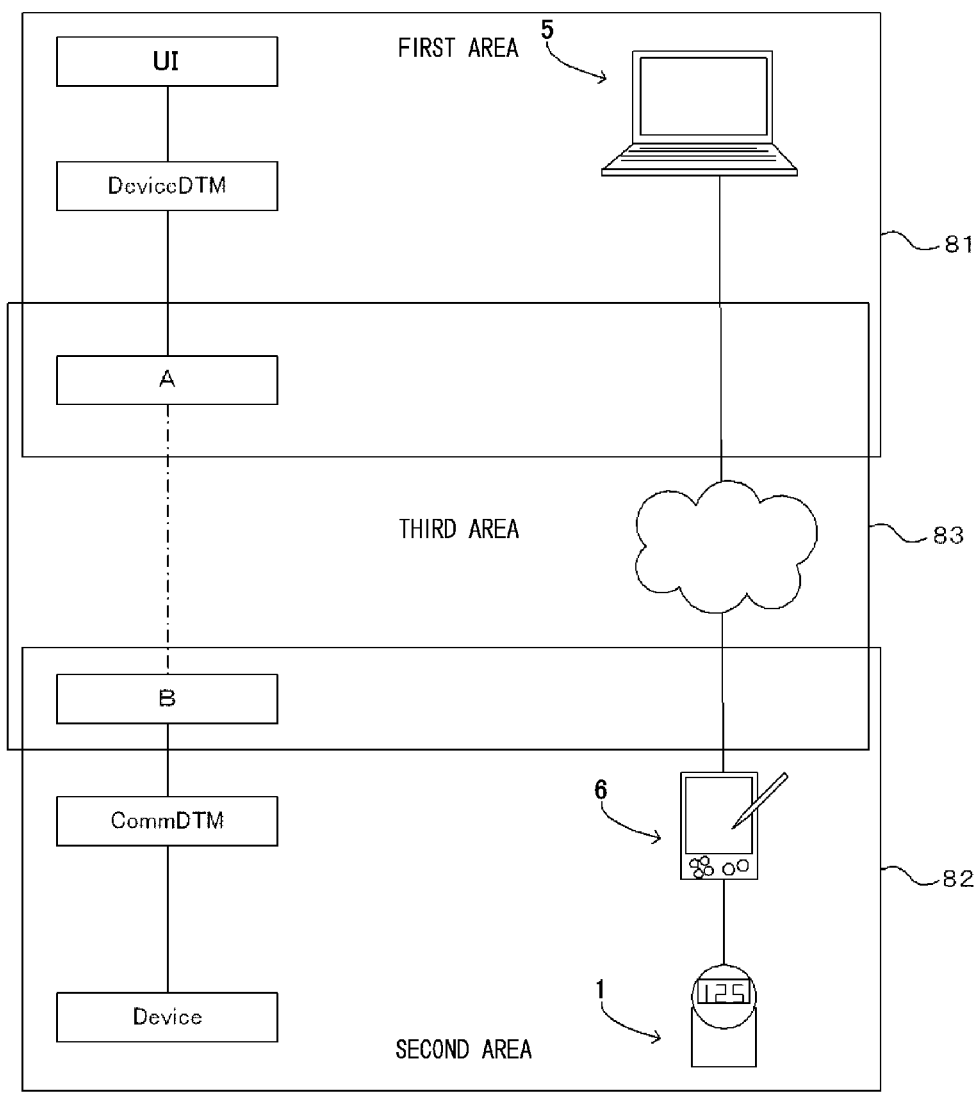
FIG. 2 is a view illustrating a connection state between the field device and a connection terminal device in accordance with the first preferred embodiment of the present invention.

FIG. 2 is a view illustrating a connection state between the field device 1 and the connection terminal device 5 in accordance with the first preferred embodiment of the present invention.

As shown in FIGS. 1 and 2, the portable terminal device 6 is connected to the field device 1. Thereby, the field device 1 and the connection terminal device 5 are connected by using a second communication path through the portable terminal device 6 and a communication line 7. A communication interface is mounted on the portable terminal device 6. The communication interface is used to perform communication between the field device 1 and the connection terminal device 5.

In FIG. 2, a first area 81 indicates a software configuration in the connection terminal device 5. The first area 81 includes a User Interface (UI), a DeviceDTM, and a unit with a reference numeral "A." A Device Type Manager (DeviceDTM) is drive software of a field device provided based on Field Device Tool (FDT) technology. The unit with a reference numeral "A" is a virtual CommDTM. The unit with a reference numeral "A" is recognized as a CommDTM, and an operator can perform the setting operation on the field device 1 through a display screen in the connection terminal device 5. The CommDTM is drive software for supporting communication with the field device 1.

In FIG. 2, a second area 82 indicates a software configuration in the portable terminal device 6. The second area 82 includes a unit with a reference numeral "B," a CommDTM, and the field device 1 as a Device. The unit with a reference numeral "B" is a virtual DeviceDTM. The unit with a reference numeral "B" is recognized as a DeviceDTM, and performs the transfer of data on the CommDTM, calls a parameter from the field device 1 as a Device, and writes the parameter to the field device 1.

The portable terminal device 6 includes a DTM frame, the CommDTM, and the virtual DeviceDTM. The connection terminal device 5 functions as a terminal device on which the DTM frame, the DeviceDTM, and the virtual CommDTM operates.

A third area 83 indicates a software configuration in the communication line 7. The third area 83 includes the virtual CommDTM ("A") and the virtual DeviceDTM ("B"). In the third area, the virtual CommDTM ("A") and the virtual DeviceDTM ("B") perform the transfer of data by using the communication interface included in each of the connection terminal device 5 and the portable terminal device 6. The communication interface may be one of Ethernet communication, Bluetooth, a telephone line, a satellite communication device, and a PLC.

Using the above configuration, when the connection terminal device 5 receives the input operation, the connection terminal device 5 transmits a necessary parameter to the field device 1 through the second communication path via the terminal device 6 and the communication line 7. Thereby, the necessary parameter is written to the field device 1.

Also, when the connection terminal device 5 receives the input operation, the connection terminal device 5 performs a necessary data input or data update on the device management database stored in the connection terminal device 5.

Figure 3:
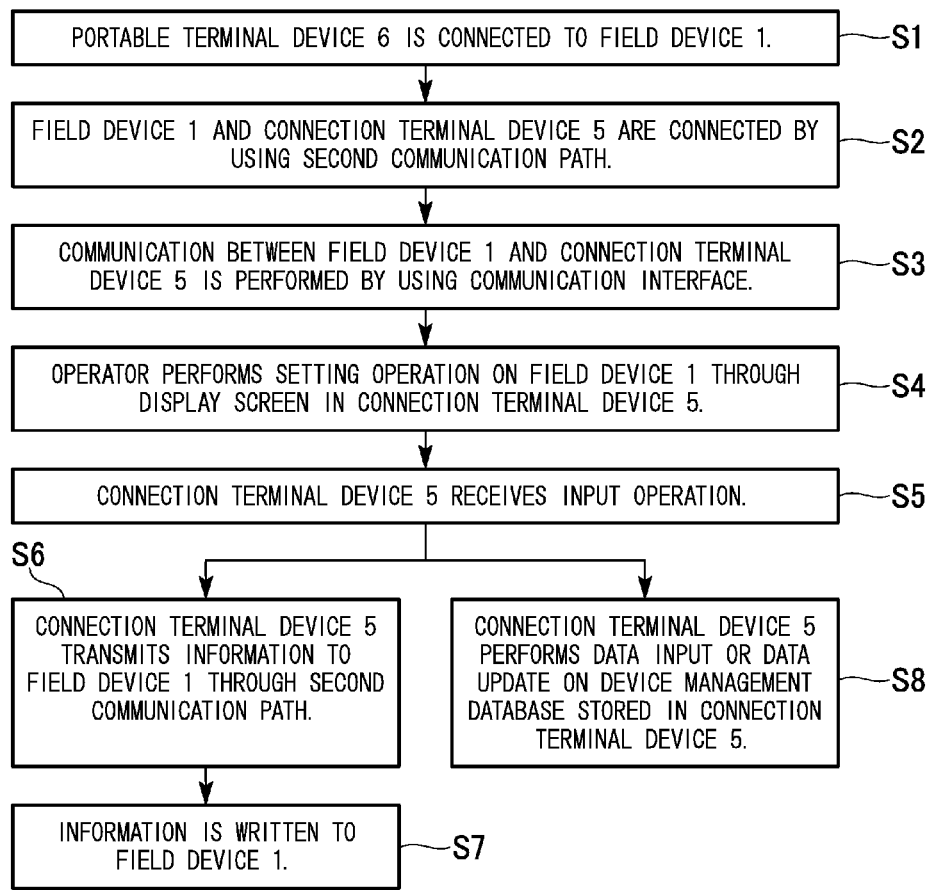
FIG. 3 is a flow chart illustrating the setting method (Method 3) of the field device in accordance with the first preferred embodiment of the present invention.
Figure 4:
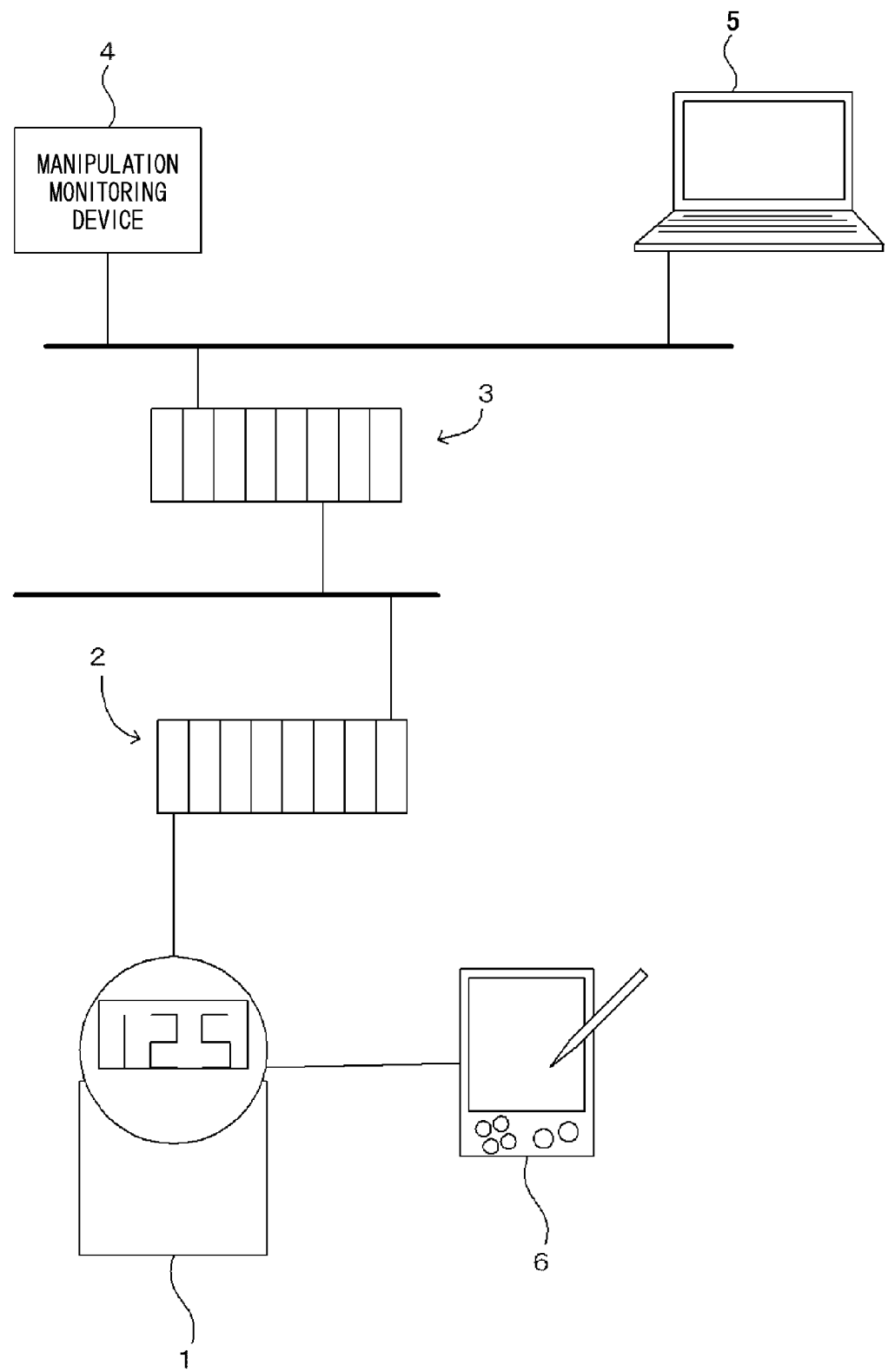
FIG. 4 is a view illustrating a configuration example of a field control system in accordance with the related art.

FIG. 3 is a flow chart illustrating the setting method (Method 3) of the field device in accordance with the first preferred embodiment of the present invention.

In step S1, the portable terminal device 6 is connected to the field device 1. Thereby, in step S2, the field device 1 and the connection terminal device 5 are connected by using the second communication path. Then, in step S3, communication between the field device 1 and the connection terminal device 5 is performed by using the communication interface.

Then, in step S4, an operator performs setting operation on the field device 1 through a display screen in the connection terminal device 5. In step S5, the connection terminal device 5 receives input operation.

If the connection terminal device 5 receives the input operation, then, in step S6, the connection terminal device 5 transmits information to the field device 1 through the second communication path. Thereby, in step S7, the information is written to the field device 1.

In parallel, if the connection terminal device 5 receives the input operation, then, in step S8, the connection terminal device 5 performs data input or data update on device management database stored in the connection terminal device 5.

In this manner, according to Method 3, the field device 1 is connected to the connection terminal device 5, without using the first communication path (field control communication line) through the field controller 3 and the multiplexer 2. As such, the setting process is performed irrespective of situations of the first communication path (field control communication line). The first communication path (field control communication line) is not used while the setting process is performed on the field device. Thus, a negative effect of the setting process for the field device on field control communication can be avoided.

The setting process can be performed on the field device 1 by only the input operation for the connection terminal device 5, and in parallel the data input and the data update are performed on the device management database stored in the connection terminal device 5. Thereby, it is not necessary to coordinate the operation in the field of a plant with the operation in the control room or the instrument panel room.

In addition, a general-purpose terminal device can be used as the connection terminal device 5. Thereby, the connection terminal device 5 can easily support various communication interfaces. As for change of the communication interface, all you have to do is to replace software for the unit with a reference numeral "A" and the unit with a reference numeral "B" in the third area 83 in FIG. 2 with software corresponding to the communication interface to be used. A familiar OS and software can be used by using a general-purpose terminal device as the connection terminal device 5. Thereby, the setting process can be performed without requiring any knowledge of dedicated hardware or dedicated software. In addition, if a kind of supportable communication interface is increased and, for example, the satellite line or the like is available, then access from a remote place to the field device becomes enabled.

Since the amount of data and parameters in the field device to be subjected to the setting process are relatively small, the amount of communication while setting the field device can be suppressed. Accordingly, a low-speed line can be used as the second communication path for setting the field device through the portable terminal device 6 and the communication line 7.

By connecting the portable terminal device 6 to the field device 1, the second communication path for performing the setting process on the field device can temporarily be used as a line for field control communication. That is, the second communication path through the portable terminal device 6 and the communication line 7, together with the first communication path (field control communication line) through the field controller 3 and the multiplexer 2 can be used as the field control communication line. Thereby, a redundancy of field control communication can be achieved.

The second communication path through the portable terminal device 6 and the communication line 7 can be used to collect data while the field test is performed or the like. For example, process data, error information, a self diagnosing result or the like stored in the field device 1 can be collected to the side of the connection terminal device 5 through the second communication path that is via the portable terminal device 6 and the communication line 7.

As described above, according to the setting method of a field device and the setting system of a field device of the present invention, the terminal device performs setting for the field device by transmitting information necessary for setting the field device from the terminal device to the field device through the second communication path, and the terminal device performs setting for the terminal device itself necessary with the setting for the field device. Thereby the burden for the setting process can be reduced.

The present invention can be widely applied to the setting method of a field device, the setting system of a field device or the like that performs setting for each field device, to which a communication line used in control data communication is connected, through the terminal device.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A setting system of field devices comprising:
   a first communication path connected to each of the field devices;
   a terminal device that performs a first setting for each of the field devices through the first communication path;
   a relay device connected to each of the field devices; and a second communication path formed between each of the field devices and the terminal device via the relay device, the second communication path being different from the first communication path,
wherein the terminal device comprising:
a receiving unit that receives an input operation of information;
a first setting unit that performs the first setting for each of the field devices by transmitting information necessary for the first setting from the terminal device to each of the field devices through the second communication path in response to the input operation received by the receiving unit; and
a second setting unit that performs a second setting for the terminal device, the second setting being necessary with the first setting for each of the field devices in response to the input operation received by the receiving unit,
wherein the relay device is a setting terminal device having an operation unit configured to receive an input operation by a user, and the setting terminal device is configured to perform the first setting for each of the field devices connected to the setting terminal device by receiving the input operation via the operation unit in a state in which the setting terminal device is directly connected to each of the field devices, and
wherein the terminal device functions as a terminal device on which a DTM frame, a DeviceDTM, and a virtual CommDTM operates, and the relay device includes the DTM frame, a Comm DTM, and a virtual DeviceDTM.

2. The setting system of field devices according to claim 1, wherein the first setting for each of the field devices sets various parameters such as device information and information necessary for communication.

3. The setting system of field devices according to claim 1, wherein
the terminal device stores a device management database for which data input and data update are needed based on the first setting for each of the field devices,
if write and change of parameters are performed on each of the field devices, then update of the device management database is needed as the second setting for connection terminal device.

4. The setting system of field devices according to claim 1, wherein
the virtual CommDTM and the virtual DeviceDTM perform transfer of data by using a communication interface included in each of the terminal device and the relay device.

5. The setting system of field devices according to claim 4, wherein
the communication interface is one of Ethernet communication, Bluetooth, a telephone line, a satellite communication device, and a PLC.

6. The setting system of field devices according to claim 1, wherein
the terminal device is configured to perform the first setting for each of the field devices by using FDT/DTM standard advocated by FDTGroup.

7. A setting method of field devices that performs setting for each of the field devices through a terminal device, each of the field devices being connected to a first communication path that is used in control data communication, the setting method comprising:
forming a second communication path via a relay device between each of the field devices and the terminal device by connecting the relay device to each of the field devices, the second communication path being different from the first communication path;
receiving an input operation of information by the terminal device;
performing, by the terminal device, a first setting that sets for each of the field devices by transmitting information necessary for the first setting from the terminal device to each of the field devices through the second communication path in response to the input operation received by the terminal device; and
performing, by the terminal device, a second setting that sets for the terminal device that is necessary with the first setting for each of the field devices in response to the input operation received by the terminal device,
wherein the relay device is a setting terminal device having an operation unit configured to receive an input operation by a user, and the setting terminal device is configured to perform the first setting for each of the field devices connected to the setting terminal device by receiving the input operation via the operation unit in a state in which the setting terminal device is directly connected to each of the field devices, and
wherein the terminal device functions as a terminal device on which a DTM frame, a DeviceDTM, and a virtual CommDTM operates, and the relay device includes the DTM frame, a Comm DTM, and a virtual DeviceDTM.

8. The setting method of field devices according to claim 7, further comprising:
performing the control data communication by using the second communication path.

9. The setting method of field devices according to claim 7, further comprising:
collecting information stored in each of the field devices by using the second communication path.

10. The setting method of field devices according to claim 7, wherein
the first setting for each of the field devices sets various parameters such as device information and information necessary for communication.

11. The setting method of field devices according to claim 7, wherein
the terminal device stores a device management database for which data input and data update are needed based on the first setting for each of the field devices,
if write and change of parameters are performed on each of the field devices, then update of the device management database is needed as the second setting for connection terminal device.

12. The setting method of field devices according to claim 7, wherein
the virtual CommDTM and the virtual DeviceDTM perform transfer of data by using a communication interface included in each of the terminal device and the relay device.

13. The setting method of field devices according to claim 12, wherein
the communication interface is one of Ethernet communication, Bluetooth, a telephone line, a satellite communication device, and a PLC.

14. The setting method of field devices according to claim 7, wherein
the terminal device performs the first setting for each of the field devices by using FDT/DTM standard advocated by FDTGroup.

* * * * *